(12) United States Patent
Park

(10) Patent No.: US 6,789,575 B2
(45) Date of Patent: Sep. 14, 2004

(54) HIGH EFFICIENT VALVE ASSEMBLY OF COMPRESSOR

(75) Inventor: Gyu-chang Park, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 231 days.

(21) Appl. No.: 10/090,396

(22) Filed: Mar. 4, 2002

(65) Prior Publication Data

US 2003/0075224 A1 Apr. 24, 2003

(30) Foreign Application Priority Data

Oct. 19, 2001 (KR) ........................................ 2001-64550

(51) Int. Cl.[7] .............................................. F16K 15/03
(52) U.S. Cl. ..................................... 137/856; 137/527
(58) Field of Search ................................ 137/856, 855, 137/857, 527

(56) References Cited

U.S. PATENT DOCUMENTS 5,178,183 A * 1/1993 Kim ........................... 137/857
5,577,901 A * 11/1996 Yoon .......................... 137/856
5,887,622 A * 3/1999 Ahn ........................... 137/856

* cited by examiner

Primary Examiner—Kevin Lee
(74) Attorney, Agent, or Firm—Westman, Champlin & Kelly, P.A.

(57) ABSTRACT

A high efficient valve assembly of a compressor has a valve plate having more than one discharging valve; a discharging valve for opening and closing the discharging valve, one end of the discharging valve is settled at the valve plate between the valve plate and a cylinder head; a stopper for controlling the discharging valve to be placed at a right position, both ends of the stopper are settled at the valve plate at an upper part of the discharging valve; a rivet for settling the discharging valve and the stopper at the valve plate; and settlement units for positioning the discharging valve at the valve plate at the right position and supporting the discharging valve. According to the present invention, the high efficient valve assembly has the discharging settlement units capable of settling the discharging valve of which only one end is supported and supporting the discharging valve, thus the assemble of the valve assembly can be easily done. Furthermore, the position of the discharging valve is not changed afterwards, and power is less consumed since the operation delay of the discharging valve is minimized.

4 Claims, 4 Drawing Sheets

HIGH EFFICIENT VALVE ASSEMBLY OF COMPRESSOR

The present application is based on and claims the benefit of Korean patent application Serial No. 2001-64550, filed Oct. 19, 2001, the contents of which are hereby incorporated by reference in their entirety.

BACKGROUND OF THE INVENTION

1. Field of the Invention

The present invention relates to a high efficient valve assembly of a compressor, and more particularly, to a high efficient valve assembly of a compressor capable of reducing a refrigerant discharging load by lessening an operation time of a discharging valve and diminishing the pressure of the entire compressor.

2. Description of the Related Art

Generally, a compressor converts a mechanical energy to a compressed energy of a compressed fluid. The compressor draws in a refrigerant from a low-pressure evaporator for compressing the refrigerant in a freezer such as a refrigerator and compresses the refrigerant up to a condensation pressure. The compressor includes a reciprocal compressor, a rotate-type compressor, and a turbo-type compressor.

FIG. 1 is a view showing a conventional reciprocal hermetic compressor among various compressors. The reciprocal hermetic compressor generally comprises: an electric motor 20 including a stator 21 and a rotor 22 in a casing 10; and a compressing unit 30 for drawing in the refrigerant by a rotation of a crank shaft 23 inserted in a center of the rotor 22 and discharging the refrigerant after compressing the refrigerant. The compressing unit 30 comprises: a cylinder 31 for containing the refrigerant; and a piston 32 for compressing the refrigerant by reciprocally moving in the cylinder 31. A cylinder head 33 is disposed at a front side of the cylinder in order to seal the cylinder 31. A valve assembly 40 is disposed between the cylinder head 33 and the cylinder 31 in order to allow the refrigerant to be supplied into the cylinder 31 or to be discharged from the cylinder 31.

As shown in FIG. 2, the valve assembly 40 comprises: a valve plate 42 having a discharging valve 41; a discharging valve 43 disposed between the valve plate 42 for opening and closing the discharging valve 41 and the cylinder head 33, and a center of the discharging valve 43 is bent downwardly; a discharging tension valve 44 disposed above the discharging valve 43, and a center of the discharging tension valve 44 is bent upwardly; a stop valve 45 disposed above the discharging tension valve 44, and the stop valve 45 controls an opening degree of the discharging valve 43 and the discharging tension valve 44; a stopper 46 disposed above the stop valve 45, and the stopper 46 controls the stop valve 45 to be placed on a right position; and a keeper 47 for elastically pressing and supporting the stopper 46.

An operation of the reciprocal hermetic compressor having the above structure is as follows. When the piston 32 retreats, the refrigerant of low temperature and low pressure flows from the evaporator of a freezer such as the refrigerator into a suction valve of the valve assembly 40 through a suction pipe and a suction muffler settled to be sealed at an upper casing or a lower casing. When the piston 32 advances, the refrigerant of high temperature and high pressure (the refrigerant has been compressed by the piston 32 in the cylinder 31) flows from the discharging valve 43 of the valve assembly 40 to the outer evaporator through a discharging pipe connection tube settled to be sealed at a discharging pipe (not shown), the upper casing and the lower casing.

However, the valve assembly 40 of the conventional hermetic compressor having the above structure is bent to form a U-type with the discharging tension valve 44 to allow the discharging valve 43 to open and close the discharging valve 41 so that both ends of the valve assembly 40 can be supported. Moreover, the valve assembly 40 has a structure that the discharging valve 43 disposed at a lower part of the valve assembly 40 closes the discharging valve 41 by an elastic force of the both ends of the valves 43, 44. Therefore, an opening time of the discharging valve 43 at the time that the compressed gas is discharged is slowed down since the elastic force of the both ends of the valve 43, 44 is relatively magnified. Accordingly, the conventional hermetic compressor has a problem of overloaded discharging of the refrigerant. The overloaded discharging of the refrigerant deteriorates the efficiency of the compressor as the refrigerant pressure of the entire compressor is increased.

To solve the above problem, some methods for settling the discharging valve at one end have been recently introduced. Yet, for these methods, the right positioning of the discharging valve is difficult when the valve assembly is assembled since the discharging valve is settled at only one end. In addition, although the discharging valve is accurately assembled, the assembled position is changed afterwards. Therefore, the efficiency of the compressor is deteriorated.

SUMMARY OF THE INVENTION

The object of the present invention is to provide a high efficient valve assembly capable of not only minimizing the operation delay of a discharging valve and reducing the consumed power but also settling the discharging valve at a right position and supporting the discharging valve as only one end of the discharging valve is supported.

The above object is accomplished by providing a high efficient valve assembly of a compressor comprising: a valve plate having more than one discharging hole; a discharging valve for opening and closing the discharging hole, one end of the discharging valve is settled at the valve plate between the valve plate and a cylinder head; a stopper for controlling the discharging valve to be placed in position, both ends of the stopper are settled at the valve plate over the discharging valve; a fixing member for settling one end of the discharging valve and both ends of the stopper at the valve plate; and a first settlement unit formed at the discharging valve and the valve plate for positioning the discharging valve at the valve plate in position and supporting the discharging valve. Selectively, the valve assembly further comprises a second settlement unit formed at the discharging valve and the stopper for settling the stopper at the discharging valve in order to support the discharging valve and help the positioning of the stopper.

In the preferred embodiment of the present invention, the first settlement unit comprises: a protrusion formed at one end of the discharging valve settled at the valve plate; and a groove formed at a part of the valve plate corresponding to the protrusion in order to embrace the protrusion. In addition, the second settlement unit comprises: a support portion formed at the stopper to be protruded downwardly to a lower part of one end of the discharging valve; and an embracing hole formed at a part of the discharging valve corresponding to the support portion in order to embrace the support portion.

BRIEF DESCRIPTION OF THE DRAWINGS

The object and the feature of the present invention will be more apparent by describing the preferred embodiment of the present invention by referring to the appended drawings, in which.

DETAILED DESCRIPTION OF THE PREFERRED EMBODIMENT

Figure 1:
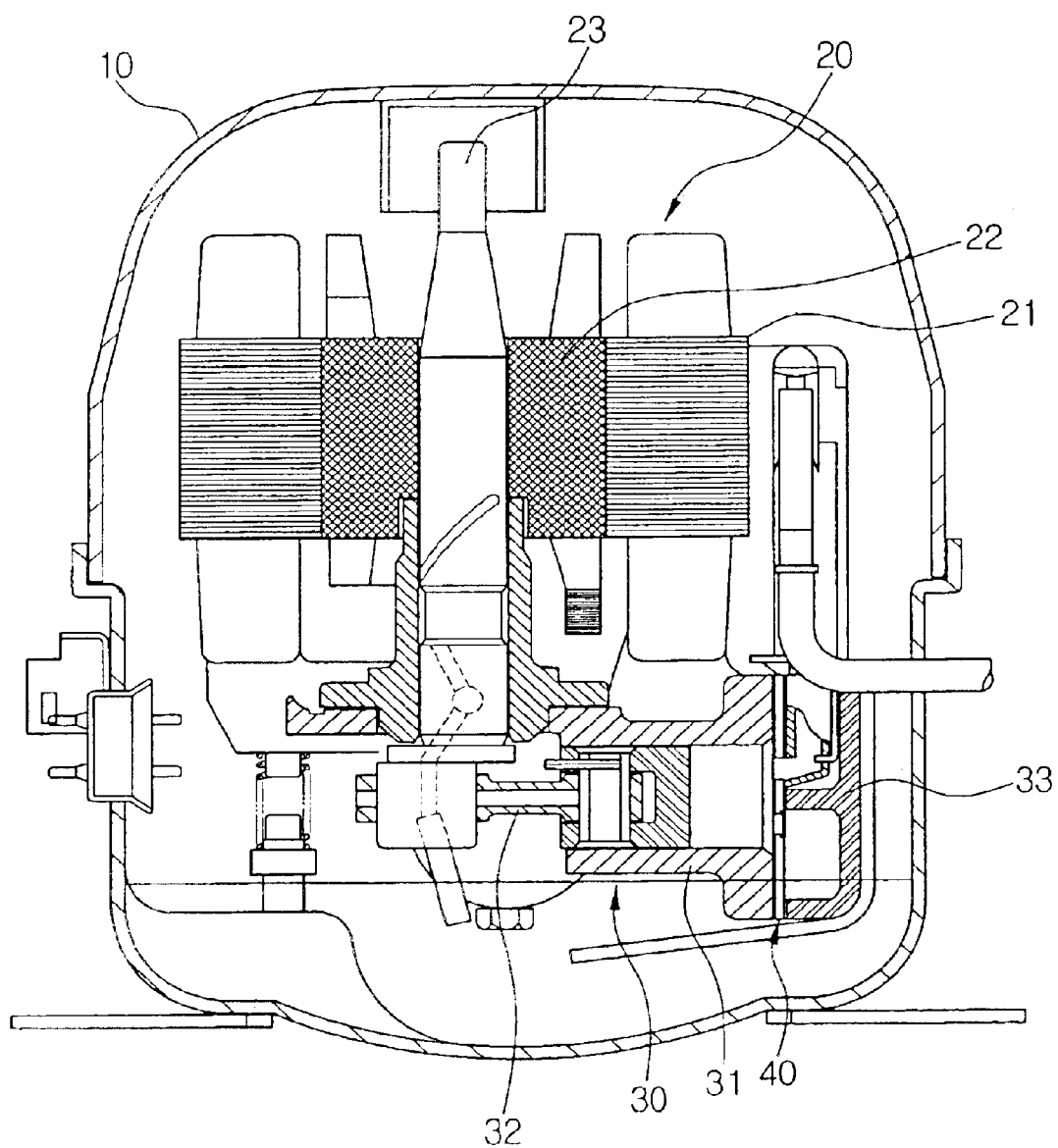
FIG. 1 is an end view showing a conventional reciprocal compressor.
Figure 2:
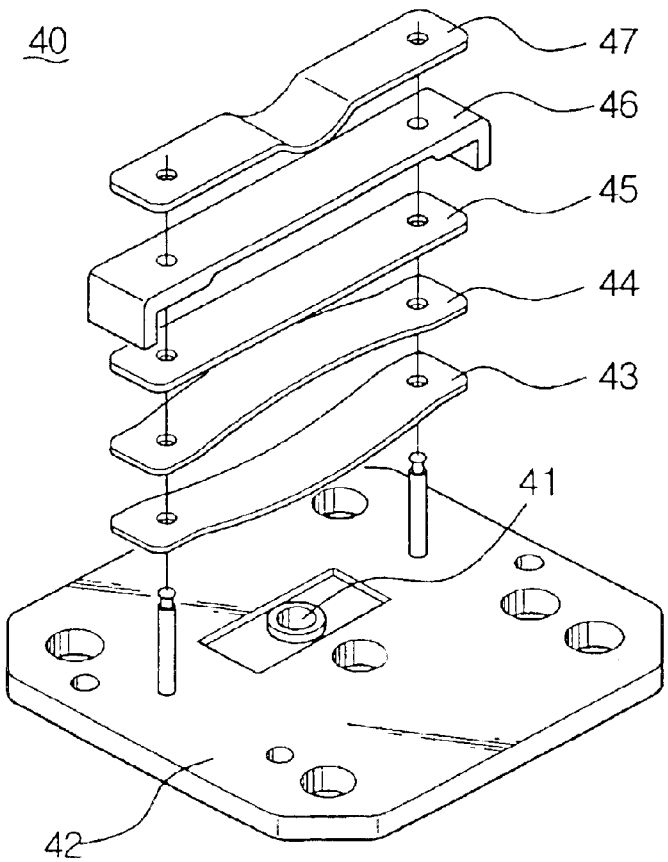
FIG. 2 is a perspective view showing a valve assembly of the conventional compressor.
Figure 3:
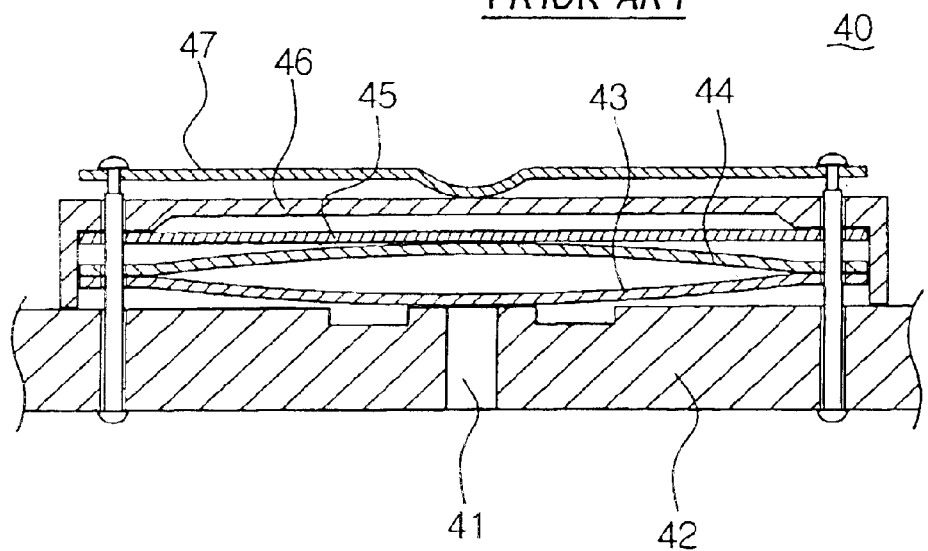
FIG. 3 is an end view showing the conventional valve assembly.

Hereinbelow, the preferred embodiment of the present invention will be described in great detail by referring to the appended drawings. The same elements as the related art have given the same reference numerals in FIGS.

Figure 4:
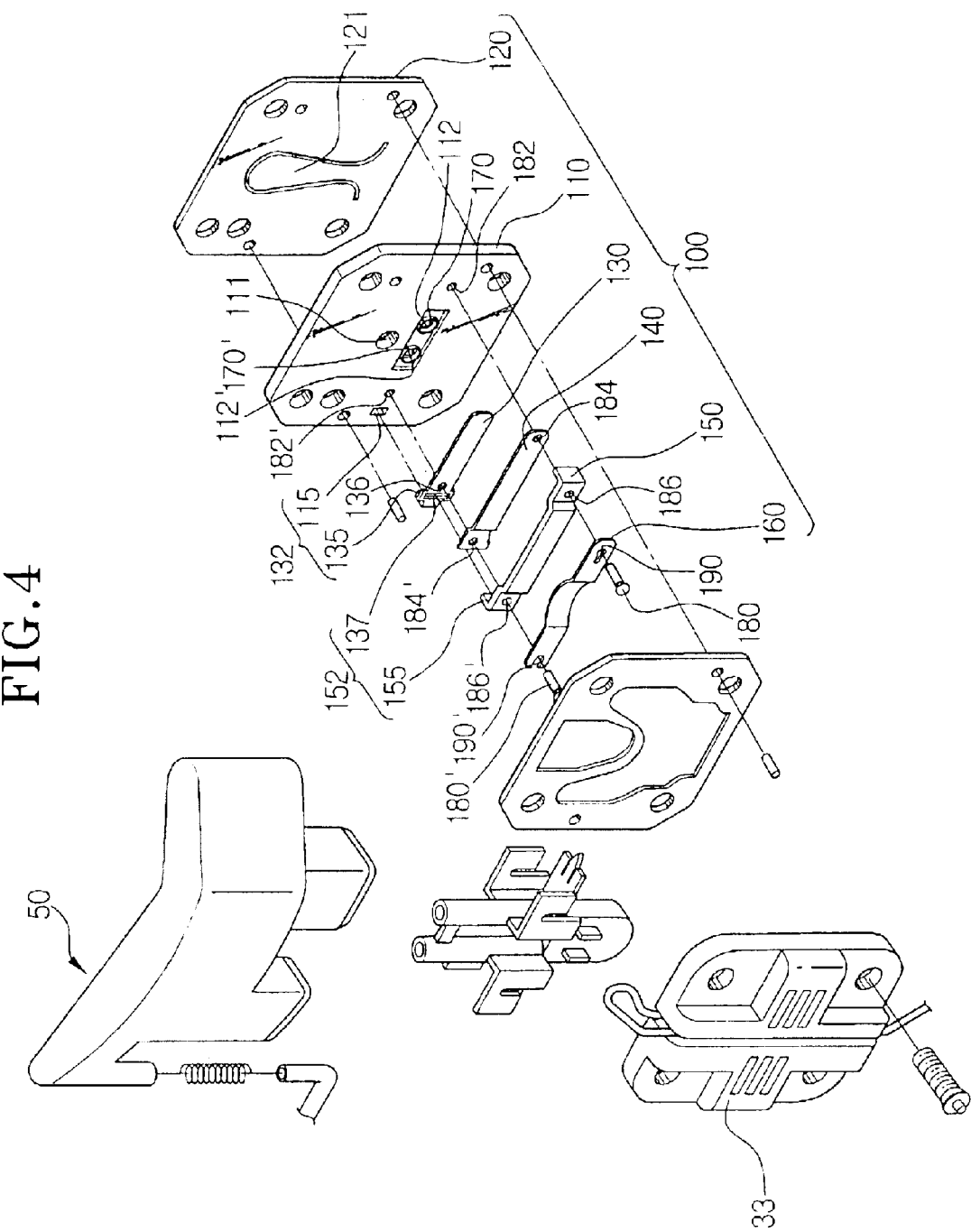
FIG. 4 is an exploded perspective view showing a valve assembly of a compressor according to the present invention.

Referring to FIG. 4, a high efficient valve assembly 100 of the present invention comprises: a valve plate 110 having a refrigerant suction hole 111 and a first and a second discharging holes 112, 112'; a suction valve plate 120 having a suction valve 121 disposed between the valve plate 110 and a cylinder 31 (refer for FIG. 1) in order to open and close the refrigerant suction hole 111; a discharging valve 130 disposed between the valve plate 110 and the cylinder head 33 in order to open and close the discharging holes 112, 112'; a stop valve 140 disposed at an upper part of the discharging valve 130 in order to control an opening degree of the discharging valve 130; a stopper 150 disposed at an upper part of the discharging valve 130 in order to control the discharging valve 130 and the stop valve 140 to be placed at a right position; a keeper 160 for flexibly supporting and settling the stopper 150; and discharging valve settlement units 132, 152 for positioning the discharging valve 130 at the right position and preventing the discharging valve 130 from moving. One end of the discharging valve 130 is settled at the valve plate 110 by a second rivet 180'.

Figure 5:
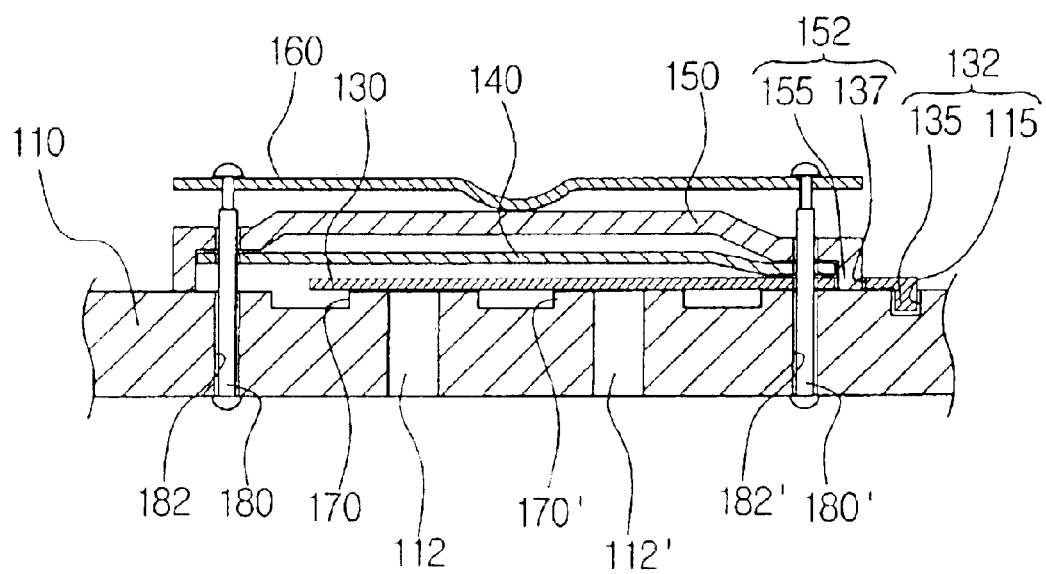
FIG. 5 is an end view showing the valve assembly of FIG. 4.

Referring to FIG. 5, the discharging valve 130 comprises: a free end placed at an upper part of the first and the second discharging holes 112, 112', in other words, at a round protrusions 170. 170'; and a fixing end settled at the valve plate 110. The stop valve 140 has a first fixing end disposed at an upper part of the free end of the discharging valve 130, and a second fixing end settled at the valve plate 110 with the fixing end of the discharging valve 130. The stopper 150 has a first and a second fixings end settled at the valve plate with the first and the second fixing ends of the stop valve 140. The keeper 160 also has a first and a second fixing ends settled at the valve plate 110 above the first and the second fixing ends of the stopper 150.

The fixing end of the discharging valve 130 and the second fixing ends of the stop valve 140 and the stopper 150 are settled at the valve plate 110 by the second rivet 180'. The first ends of the stopper 140, the stopper 150 and the keeper 160 are settled at the valve plate 110 by a first rivet 180.

As shown in FIGS. 4 and 5, the discharging valve settlement units 132, 152 comprise: a first settlement unit 132 for positioning the discharging valve 130 of which one end is settled at the valve plate 110 by the second rivet 180' at the right position and firmly settling the discharging valve 130 not to move; and a second settlement unit 152 for further supporting and settling the discharging valve 130 positioned and supported by the first settlement unit 132 and helping the positioning of the stopper 150.

As shown in FIG. 5, the first settlement unit 132 comprises a protrusion 135 protruded downwardly at the end of the fixing end of the discharging valve 130 settled at the valve plate 110, and a hole 115 formed at some part of the valve plate 110 corresponding to the protrusion 135 in order to embrace the protrusion 135. It is preferable that the protrusion 135 and the hole 115 have square types so that the discharging valve 130 can be placed at the right position.

The second settlement unit 152 has: a protrusion support portion 155 protruded downwardly from the end of the second fixing end of the stopper 150 (the stopper 150 is disposed at the fixing end of the discharging valve 130) settled by the second rivet 180' in order to further support the discharging valve 130 in the status that the protrusion 135 of the first settlement unit 132 is inserted into the hole 115; and a embracing hole 137 formed at some part of the fixing end of the discharging valve 130 corresponding to the protrusion support portion 155 in order to embrace and support the protrusion support portion 155. The second settlement unit 152 not only supports and settles the discharging valve 130 but also allows the stopper 150 to be easily positioned when the valve assembly 100 is assembled. Therefore, it is preferable that the protrusion support portion 155 and the embracing hole 137 forming the second settlement unit 152 are also formed as the square types for the right positioning.

An assembling process of the high efficient valve assembly 100 of the compressor according to the present invention having the above structure will be described referring to FIGS. 4 and 5 hereinbelow. First of all, the discharging valve 130 is mounted on the valve plate 110 arrayed with the suction valve plate 120 in order to insert the protrusion 135 into the hole 115 as a rivet embracing hole 136 formed at the fixing end is arrayed with a second rivet embracing hole 182' of the valve plate 110. Then, the stop valve 140 is mounted on the discharging valve 130 in order to array the first and the second rivet holes with the first rivet embracing hole 182 of the valve plate 110 and the rivet embracing hole 136 of the discharging valve 130. After that, the stopper 150 is disposed above the stop valve 140 in order to insert the protrusion support portion 155 protruded downwardly at the second fixing end into the embracing hole 137 of the discharging valve 130, as the first rivet embracing hole 186 formed at the first fixing end is arrayed with the first rivet embracing hole 184 of the stop valve 140. When the first and second rivets 180, 180' are connected with the corresponding rivet embracing holes, after the keeper 160 is being mounted on the stopper 150 as the keeper 150 arrays the first and the second rivet embracing holes 190, 190' formed at the first and the second fixing ends with the first and the second rivet embracing holes 186, 186' of the stopper 150, the valve assembly 100 is completely assembled. As described so far, the valve assembly 100 of the present invention allows the discharging valve 130 to be easily placed at the right position. Furthermore, the position of the valve assembly 100 is not changed afterwards and firmly settled.

Next, the operation of the high efficient valve assembly 100 of the present invention will be described referring to FIGS. 1, 4 and 5.

First of all, a refrigerant of low temperature and low pressure drawn from an outside of the compressor is drawn into a cylinder head 33 through a suction muffler 50 when the suction valve 121 is opened due to a difference of a pressure between an inside and an outside of the valve at the time that a piston 32 retreats. After that, when the piston 32 advances, the refrigerant of high temperature and high pressure compressed by the piston 32 in the cylinder 31 flows to the outer evaporator through the discharging pipe as the discharging valve 130 is pushed away by the pressure of the refrigerant through the discharging holes 112, 112' of the valve plate 110.

At this time, in the valve assembly 100 of the present invention, the discharging valve 130 has a type of one arm supported at one end, a less force is needed to open the discharging valve 130 when the compressed refrigerant is discharged. Thus time required for opening the discharging valve 130 is also minimized, and the discharging load generated when the refrigerant pushes the discharging valve 130 is much reduced. Accordingly, the refrigerant pressure of the entire compressor and the discharging load is reduced as much as the reduced force.

As described so far, the high efficient valve assembly of the compressor according to the present can easily settle the discharging valve at the right position and support the discharging valve when being assembled and the position of the discharging valve is not changed afterwards. Besides, power is less consumed because the operation delay of the discharging valve is minimized as one end of the discharging valve is supported.

So far, the preferred embodiment of the present invention has been illustrated and described. However, the present invention is not limited to the preferred embodiment described here, and someone skilled in the art can modify the present invention without distorting the point of the present invention claimed in the claim part.

What is claimed is:

1. A high efficient valve assembly of a compressor, comprising:

a valve plate having more than one discharging hole;

a discharging valve for opening and closing the discharging hole, one end of the discharging valve is settled at the valve plate between the valve plate and a cylinder head;

a stopper for controlling the discharging valve to be placed in position, both ends of the stopper are settled at the valve plate above the discharging valve;

a fixing member for settling one end of the discharging valve and both ends of the stopper at the valve plate; and a first settlement unit formed at the discharging valve and the valve plate for positioning the discharging valve at the valve plate in position and supporting the discharging valve.

2. The high efficient valve assembly of claim 1, further comprising a second settlement unit formed at the discharging valve and the stopper for settling the stopper at the discharging valve in order to support the discharging valve and help the positioning of the stopper.

3. The high efficient valve assembly of claim 1, wherein the first settlement unit comprises:

a protrusion formed at one end of the discharging valve settled at the valve plate; and a groove formed at a part of the valve plate corresponding to the protrusion in order to embrace the protrusion.

4. The high efficient valve assembly of claim 2, wherein the second settlement unit comprises:

a support portion formed at the stopper to be protruded downwardly to a lower part of one end of the discharging valve; and an embracing hole formed at a part of the discharging valve corresponding to the support portion in order to embrace the support portion.

* * * * *